(12) United States Patent
Yeung et al.

(10) Patent No.: US 12,073,663 B2
(45) Date of Patent: Aug. 27, 2024

(54) ENHANCED USABILITY AND FUNCTIONALITY OF VEHICLE ONBOARD HARDWARE AND SOFTWARE

(71) Applicant: FORD GLOBAL TECHNOLOGIES, LLC, Dearborn, MI (US)

(72) Inventors: Jeffrey Brian Yeung, Canton, MI (US); Ayush Chandrakanth Shah, Belleville, MI (US); Sandeep Sasidharan, Dearborn, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/746,382

(22) Filed: May 17, 2022

(65) Prior Publication Data

US 2022/0277597 A1 Sep. 1, 2022

Related U.S. Application Data

(62) Division of application No. 16/399,272, filed on Apr. 30, 2019, now abandoned.

(51) Int. Cl.
*G07C 5/00* (2006.01)
*G06Q 30/0283* (2023.01)
*G08G 1/01* (2006.01)

(52) U.S. Cl.
CPC ......... *G07C 5/008* (2013.01); *G06Q 30/0283* (2013.01); *G08G 1/0112* (2013.01)

(58) Field of Classification Search
CPC ... G07C 5/008; G08G 1/0112; G06Q 30/0283
See application file for complete search history.

(56) References Cited

U.S. PATENT DOCUMENTS

| | | | |
|---|---|---|---|
| 6,970,703 B2 | 11/2005 | Fuchs et al. | |
| 7,043,225 B1 | 5/2006 | Patel et al. | |
| 7,650,227 B2 | 1/2010 | Kirk et al. | |
| 9,203,843 B2 | 12/2015 | Arasavelli et al. | |
| 10,501,053 B2 | 12/2019 | Tokunaga et al. | |
| 10,638,281 B1 | 4/2020 | Mezaael et al. | |
| 2003/0225668 A1 | 12/2003 | Goto et al. | |
| 2009/0150023 A1 | 6/2009 | Grau et al. | |
| 2015/0135336 A1 | 5/2015 | Arasavelli et al. | |

*Primary Examiner* — Ramsey Refai
(74) *Attorney, Agent, or Firm* — Joseph Zane; Brooks Kushman.P.C

(57) ABSTRACT

A vehicle may receive a request for use of a vehicle resource from a remote source. The vehicle may determine if the vehicle is capable of fulfilling the request based a state of the resource. The may also determine and send a cost for using the resource, to the remote source, in response to determining the vehicle is capable of fulfilling the request and provide use of the resource in accordance with a use-term defined in conjunction with the cost, in response to receiving agreement from the remote source to pay the cost.

5 Claims, 3 Drawing Sheets

ENHANCED USABILITY AND FUNCTIONALITY OF VEHICLE ONBOARD HARDWARE AND SOFTWARE

CROSS-REFERENCE TO RELATED APPLICATIONS

This application is a division of U.S. application Ser. No. 16/399,272 filed Apr. 30, 2019, now abandoned, the disclosure of which is hereby incorporated in its entirety by reference herein.

TECHNICAL FIELD

The illustrative embodiments generally relate to methods and apparatuses for enhanced usability and functionality of vehicle onboard hardware and software.

BACKGROUND

Vehicles are including ever-more powerful computing systems. Powering onboard infotainment, telematics systems and a suite of vehicle software modules and electronic control units (ECUS), onboard vehicle computers have significant and often unused processing capability. Vehicle sensors also provide a vast array of data about the vehicle and surrounding environment as the vehicle travels, and again, this data and the sensors that provide and gather this data are often unused in many scenarios.

SUMMARY

In a first illustrative example, a mobile device includes a processor configured to request use of a vehicle resource in conjunction with an application executing on the mobile device. The processor is also configured to receive notification of a cost of using the vehicle resource. The processor is further configured to send an agreement to pay the cost to a vehicle that includes the requested resource and receive data from the vehicle resource, responsive to the sent agreement.

In a second illustrative example, a vehicle includes a processor configured to receive a request for use of a vehicle resource from a remote source. The processor is also configured to determine if the vehicle is capable of fulfilling the request based a state of the resource. The processor is further configured to send a cost for using the resource, to the remote source, in response to determining the vehicle is capable of fulfilling the request and provide use of the resource in accordance with a use-term defined in conjunction with the cost, in response to receiving agreement from the remote source to pay the cost.

In a third illustrative example, a vehicle includes a processor configured to determine one or more vehicle resources available for use by a remote source. The processor is also configured to broadcast availability of the determined one or more resources. The processor is further configured to receive a request from a remote source to use at least one of the vehicle resources and, responsive to determining that the at least one resource is not being presently used by the vehicle and is available for use by the remote source, provide use of the at least one resource in exchange for a payment agreement from the remote source.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

As vehicles grow more autonomous, onboard computing and sensor suites will become exponentially more powerful, but there will be many occasions when the vehicle is not leveraging many of the onboard sensors and not using much of the onboard computing power. The illustrative embodiments allow mobile devices, connected to the vehicle computer to offboard processing onto the vehicle computer, to both speed up mobile device processing and to save mobile device battery life. Further, mobile device users and even application developers can request and use vehicle sensor data to improve the functionality of applications and/or improve the quality and quantity of desirable data.

By allowing passengers to use onboard processing and data, as well as by allowing a vehicle owner or rider to sell data to requesting applications, new models of revenue and new models for faster processing and improved mobile battery life can be achieved, without adding any significant hardware to already existing vehicle systems.

Figure 1:
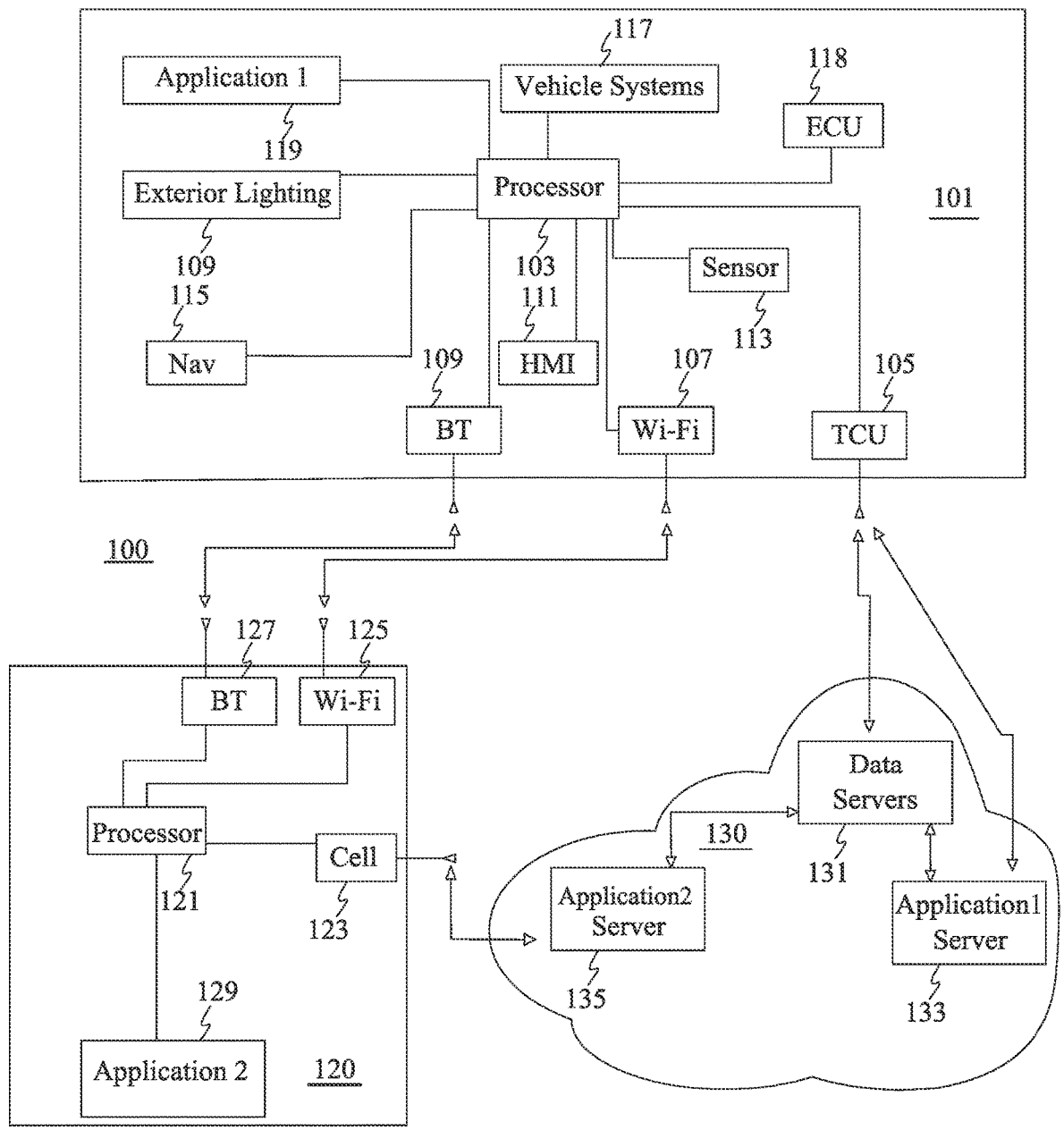
FIG. 1 shows an illustrative data-sharing system.

FIG. 1 shows an illustrative data-sharing system usable in conjunction with illustrative embodiments. In this example, an illustrative vehicle 101 is shown, including at least one onboard processor 103. The vehicle 101 may be manually driven or autonomous. While autonomous vehicles will typically have greater computing power and sensor capability, they also will have greater need to use these systems, but either type of vehicle is suitable for the illustrative embodiments, as both manually driven and autonomous vehicles will likely have opportunities for shared-computing and shared sensor data.

The vehicle 101 has a telematics control unit (TCU) 105, that provides cellular connection capability. This unit 105 allows the vehicle 101 to talk to remote systems in the cloud 130, which in this example include a data services application 131, as well as one or more application servers 133, 135. The data services application 131 can be managed by an original equipment manufacturer (OEM) and can notify the vehicle of pending data requests or opportunities to sell data to requesting entities. For example, a weather or navigation application provider may want localized data about weather conditions or road/traffic conditions in a specific locality. The application server 133, 135 can request this information from the data services 131 server, which can identify vehicles having the appropriate sensors and locations corresponding to the data request. The data services 131 server can then contact those vehicles 101 to determine if the vehicle can and will obtain and sell the requested data.

In other examples, the application server 133 may communicate directly with the vehicle 101, either because it has permission to do so or because it is supporting an application 119 that resides on the vehicle. When the application server 133 is communicating to support an onboard application 119, the server 133 may request the data through the onboard application 119. When there is not a corresponding onboard application 119, the server 133 may request the data directly from a vehicle 101.

In this example, the vehicle also includes Wi-Fi 107 and BLUETOOTH 109 transceivers, usable to communicate with a mobile device 120 in the vehicle. In addition to providing communication services, the Wi-Fi transceiver, for example, could provide a requesting application with a list of public hotspots identified by the transceiver as the vehicle travels. So, for example, if an application developer wanted to include data about available public hotspots in a locality, one or more vehicles 101 could detect those networks and provide information about their existence to the developer.

The vehicle 101 also include a human machine interface (HMI) 111, which is often a touch-sensitive display. This interface can be used to approve data requests as well as control and set settings for what data can be shared, when it can be shared, the cost of the data, any requisite anonymity, etc. The vehicle 101 further includes a plurality of onboard sensors 113. These can include, but are not limited to, location (GPS, GLONASS), interior/exterior cameras, driving data (orientation, distance traveled, speed, etc.), inertial sensors, magnetometers, pollution sensors, road quality sensing through suspension, exterior sound, etc. Autonomous vehicles may also include high quality LIDAR, RADAR or other sensors designed to precisely map the physical environment around a vehicle 101 as it travels.

Most or all of the sensors 113 have an actual vehicle-side purpose, but they are also often unused unless a specific reason occurs that requires the vehicle 101 obtain data from a given sensor 113. As such, and even in the instances when the vehicle 101 also needs the data, these sensors 113 can be leveraged to provide shareable/saleable data to a host of interested parties. Sensors 113 may have a native polling rate (how frequently they gather/report data) and may also be instructed to poll at a rate corresponding to a given request. Unless the polling is putting undue strain on otherwise needed computing resources, the vehicle 101 can easily gather and share the data from these sensors 113 as the vehicle 101 travels.

The vehicle 101 may also include a navigation computer 115. This computer may be more powerful than a mobile device 120 computer or may have access to a higher quality location signal or other navigation data useful to a mobile device's 120 native navigation function. Moreover, route data, route recommendations, points of interest and general travel habits, all tracked or trackable by the navigation system 115, may be of interest to application developers. Thus, application servers 133, 135 may be able to request navigation data from the navigation system 115 of the vehicle 101 computing system.

The vehicle 101 also includes a variety of onboard systems 117, such as brake systems, suspension systems, heating ventilation air conditioning (HVAC), entertainment systems, diagnostic systems, etc. Some or all of these systems 117 have and can report data that is interesting for a variety of both onboard mobile devices 120 and for application developers. Onboard users may leverage some of the vehicle 101 system data to replicate a game environment emblematic of current vehicle 101 conditions, for example. Mobile application developers may want to know component wear data, entertainment choices, HVAC settings and a variety of other information that can assist the developers in creating applications capable of making recommendations to other users based on observations about habits of people from whom data was gathered.

Many of the preceding vehicle 101 systems 117 are supported by electronic control units (ECUs) 118, which are often also capable of obtaining and providing specific instances of data. These ECUs 118 also may have computing power associated therewith, which can be used in a distributed computing model to improve mobile device 120 processing when the ECU 118 is not otherwise being used for its primary intended purpose.

The vehicle 101 may also include one or more onboard applications 119. These applications 119 can support or improve onboard functions, as well as provide opportunities to sell or share data offboard with an application server 133, 135. Use of some applications 119 may be rendered free by an agreement to share data, and in other instances the vehicle 101 owner or rider may be able to generate a profit, or a cost-offset (for a ride, for example) based on shared data responsive to one or more requests from the application server 133, 135.

The rider mobile device 120 may communicate with the vehicle 101 through mobile device 120 transceivers including Wi-Fi 125 and BLUETOOTH 127. The mobile device 120 also includes a processor 121 and is capable of cellular communication through a cellular transceiver 123. Through the cellular transceiver 123, the mobile device 120 can communicate with the cloud 130 and directly with application servers 133, 135, which may support applications 129 installed on the mobile device 120 or which may request data from the vehicle 101 through the mobile device 120.

The mobile device 120 can be connected to the vehicle 101 either wirelessly or through a wired USB connection, for example. When the vehicle 101 has available processing power or sensor data of interest to the mobile device 120 (as advertised by the vehicle 101 or requested by the mobile device 120, for example), the mobile device 120 may send data for processing to the vehicle processor 103, ECUs 118 or other available distributed computing resources. In other examples, the mobile device 120 may request certain data types at certain polling rates from the vehicle 101, and the vehicle 101 can respond by providing the data at the requested polling rate either back through the direct connection or via a wireless broadcast of the data, to which the mobile device 120 can subscribe.

By using such a system, the mobile device 120 can, for example, improve mapping with using a vehicle GPS combined with an inertial sensor and magnetometer. This can both save mobile device battery life and provide potentially more accurate information. The mobile device could also leverage, for example, HVAC and infotainment settings and other to enhance a mobile application experience.

By allowing the mobile device 120 to use processing resources and by allowing a vehicle owner to sell data to both the mobile device 120 and the cloud servers 133, 135, vehicle owners, or even riders, can generate new streams of revenue using technology that already exists in the vehicle 101 infrastructure.

Data transfer can be achieved, for example, through an application programming interface (API) through which a mobile application 129 could create a data link to the vehicle 101 to obtain input data (transferred over USB or WiFi), similar to how a programming interface is instantiated to subscribe to on-board sensor data already on the mobile device 120. Updates to the requested data may be broadcast by the vehicle 101 per a polling rate determined in-app on a per-sensor basis.

Implementation of an API may be up to individual developers, but a suite of data inputs obtainable from the vehicle 101 could be made available. The application 129 could poll the vehicle 101 for a policy table with capabilities, polling rates, and permissions. A whitelist (updated on the cloud 130, for example) would be created to enable applications 129 to obtain the general types of information available, but individual vehicles 101 may make determinations about if and when a given data type will or can be shared.

Figure 2:
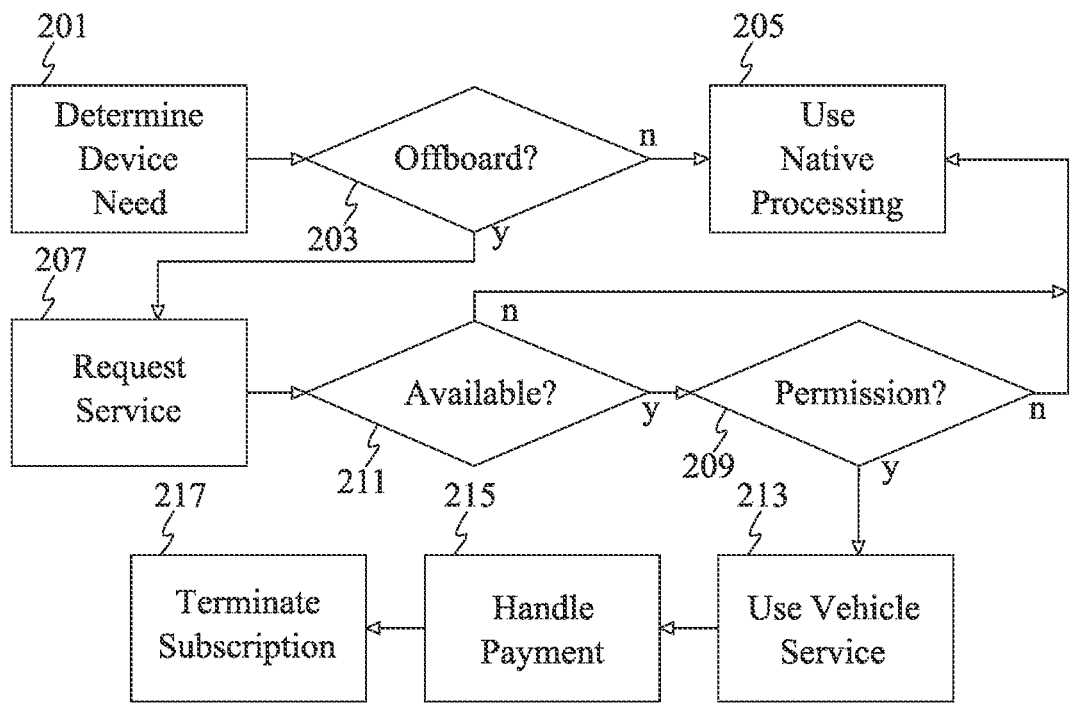
FIG. 2 shows an illustrative example of an offboarding process for a mobile device.

FIG. 2 shows an illustrative example of an offboarding process for a mobile device, executable by, for example, a mobile device processor 121. In this example, the mobile device 120 determines at 201 that a certain processing function or data set is required for an executing application 129. This offboarding capability could be built into a mobile device 120 operating system (to redirect certain data requests) or it could be built into an application 129 that is built to take advantage of interaction with a vehicle 101 that provides such functionality. If the processing or data does not require or benefit from offboarding at 203, the device 120 will just use the native processing/sensors at 205 to fulfill the device 120 need. In some instance, for example, when battery power is low, the mobile device 120 may attempt to offboard as much processing as possible to preserve battery life. In other instances, the mobile device 120 may only attempt to offboard processing if there is a significant processing need or offboard data requests when the application 129 identifies (via a whitelist related to the current vehicle 101) that a certain type of improved data can be obtained from communication with the vehicle 101.

If the device 120 determines that offboarding could be useful, the device 120 may request a service at 207. This service corresponds to a function (processing/data provision) available from the vehicle 101 as identified by a whitelist associated with the vehicle 101 or a vehicle 101 broadcast of available processing/data provision. If the requested service is available at 209, the device 120 also requests permission at 211. Certain functions may require OEM approved applications, and so even if a certain set of data is available, the device 120 or application 129 may not be approved to access that data. The availability of the processing or data will typically depend on what the vehicle 101 is currently doing with the processing power and/or data, and whether a driver/passenger/owner has approved shared-processing or sharing of the requested data type.

If the device 120 or application 129 is approved to access the requested resource at 211, the device 120 can either send the data for processing at 213 or subscribe to a broadcast of sensor data corresponding to the requested data at 213. In many instances there may be a cost associated with using vehicle 101 resources, and the device 120 can also handle payment for the requested data or processing at 215. The device 120 then receives the data at periodic polling intervals (application 129/device 120 specified or vehicle 101 specified) and, once the request is completed and fulfilled, the device 120 can unsubscribe from the data broadcast at 217.

The device 120 may need to subscribe to a certain data set in order to receive the requested data, and when the device 120 subscribes the vehicle 101 can track how many instances of data were provided to the device 120. This is useful if the device 120 is paying on a per-instance request, but in other models the device 120 may pay a fixed rate for the data subscription and the device 120 may then determine how many data points are used. Subscribing to the data may allow the device 120 to receive a key for decrypting broadcast data, or, in a more simplistic model, as long as one device 120 is subscribed to a certain data type, the vehicle 101 may simply broadcast data of that type over an available communication channel, until such time when no devices 120 are subscribed. The latter model would allow a second device to effectively obtain the data for free during the broadcast, but it would also avoid additional security protocol exchanges and may be easier to implement.

Figure 3:
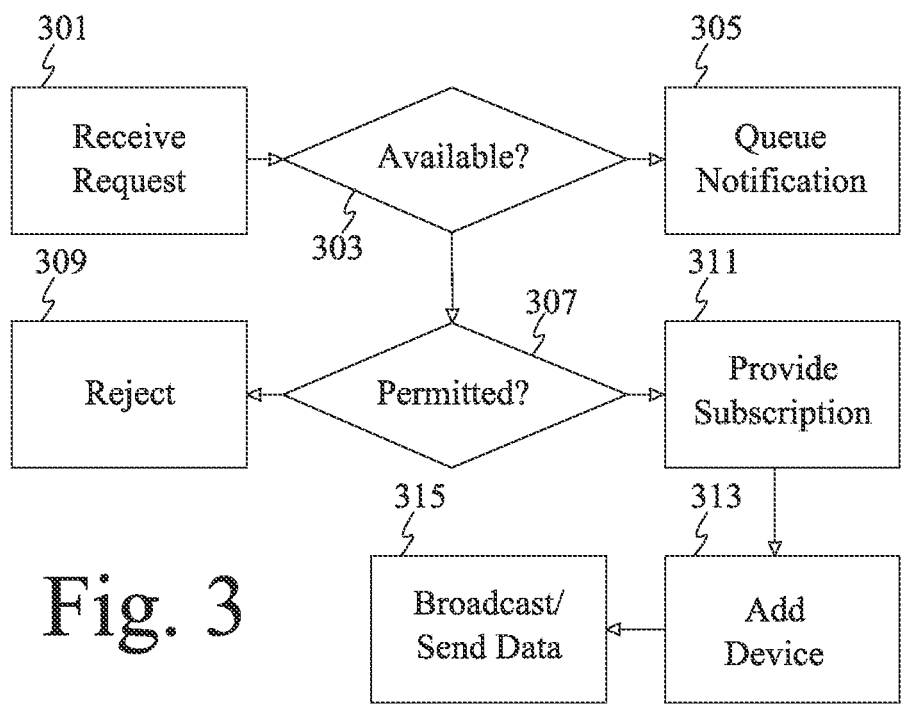
FIG. 3 shows an illustrative example of a request fulfillment process.

FIG. 3 shows an illustrative example of a request fulfillment process, executable by, for example, a vehicle 101 processor 103. In this example, the vehicle 101 receives the request for processing or data from a device 120. Also, in this example, the vehicle 101 could receive a request from an application 129 executing on the device 120, even in a situation where the device owner is not using that application 129. Certain applications 129 may be designed to leverage vehicle 101 data when available, and thus may request certain data from the vehicle 101 even if a device 120 owner does not expressly need that data. In such an instance, the application 129 developer, as opposed to the device 120 owner, would likely pay for the requested data, and in a ride-share scenario the device 120 owner may actually be selling the data to the application 129 provider to offset the cost of a ride.

For example, an enhanced navigation application 129 may use vehicle data to improve a user experience. This can include a variety of data (traffic, road states, weather, etc.) that is not of particular interest to a current passenger, but the data might be interesting to others headed to where the current passenger is currently located. At the same time, the passenger may have the right to sell the data for a given hailed-ride, to any requesting entity. Thus, the passenger could elect to sell the local sensor data to an application 129 residing on the very device 120 that the passenger brought into the vehicle 101. This would encourage people who travel frequently to load a number of applications 129 onto their phone 120 for data provision purposes, even if those people will infrequently or never use those applications 129 for other reasons.

In another example, the vehicle 101 may receive a request from the data services 131 server or an application server 133, 135. These cloud-based entities may be able to identify specific vehicles 101 that have characteristics (model, speed, type, location, etc.) desirable for spot-provision of needed data, and the cloud-based entities can request the data directly from identified vehicles 101. The driver or passenger can again determine if the data should be sold to the server, and whether the request is fulfilled may be dependent on availability of data and sharing provisions.

After the vehicle 101 receives the request at 301, the vehicle 101 may determine if the requested processing or data is available at 303. In the case of processing, the vehicle 101 may determine if the vehicle 101 itself has need for the additional processing capability, and in the case of data the vehicle 101 may determine if the vehicle 101 has the capability and the ability to share the requested data. The capability may depend on installed sensors and to what use those sensors are currently being put, and the ability may depend on the settings relating to data sharing and any power drain experienced by the vehicle 101 in exchange for obtaining and providing the requested data (i.e., a low-power state vehicle 101 may ignore all requests in order to preserve onboard power for driving purposes).

If the requested processing or data is not currently available, but could be available in the future, the vehicle 101 may queue the request at 305, and may notify the device 120 or other requesting entity when the service is available. If the requested service is currently available at 305 and is not permitted based on sharing or permission settings at 307, the vehicle 101 may reject the request at 309.

Otherwise, the vehicle 101 may provide subscription access to the requesting entity at 311, allowing the entity to subscribe to data of a certain type in the data sharing request, or may simply fulfil a processing request in the instance of a distributed computing request. If the device 120 or other entity is going to subscribe to data, the vehicle 101 may add the device 120 or entity at 313 and may share any necessary decryption or channel identification parameters with the device 120 or entity, to allow the device 120 or entity to obtain the requested results. Then, at periodic polling intervals, the vehicle 101 may broadcast the data (or send the data directly over a direct communication channel) to the device 120 or other entity at 315.

Figure 4:
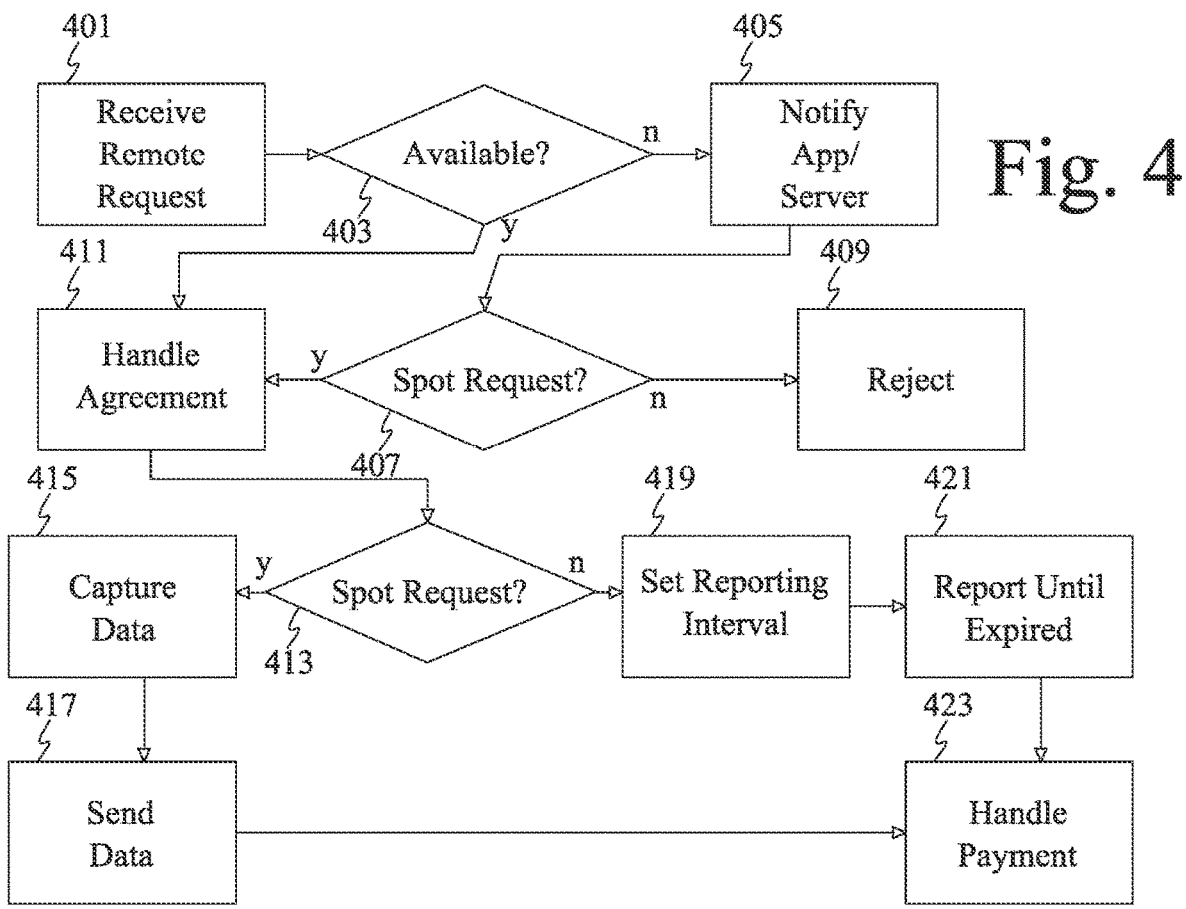
FIG. 4 shows an alternative process for providing data to a remote entity.

FIG. 4 shows an alternative process for providing data to a remote entity, executable by, for example, a vehicle 101 processor 103. In this example, the vehicle 101 receives a remote request from a remote entity at 401. This remote entity could be a data services server 131, a remote application server 133, 135, or even a remote server 133, 135 sending the request through an application 129 executing on a mobile device 120 inside a vehicle 101.

Again, if the data is not available at 403, the vehicle 101 notifies the requesting entity of the current unavailability at 405. Since remote entities will often need data relative to a specific vehicle location or locality, the entity may not be interested in the data at a future point in time. In this instance, the vehicle 101 determines if the data request is a spot-request at 407, which is a one-off request tied to a vehicle location or other temporary parameter. If the unavailable data corresponds to a spot-request at 407, the vehicle 101 rejects the request at 409, since the state of the vehicle 101 upon which the request was based will likely change by the time the data becomes available for sharing.

If the request is an ongoing request (for example, an application server 133, 135 wants to gather the identification of all wireless networks identified by a vehicle Wi-Fi transceiver 107 along a route), the vehicle 101 can handle a payment and data exchange agreement process at 411. This will typically involve specifying conditions for fulfillment, a price and an agreement to pay the price and receipt of a payment format from the requesting entity.

Once the payment and agreement handshake and negotiation has been completed at 411, the vehicle 101 determines if the request is a spot-request at 413. If the request is a one-time spot-request, the vehicle 101 obtains the requested data at 415 and sends the data to the requesting entity at 417.

On the other hand, if the request is a subscription type request requiring ongoing reporting at intervals, the vehicle 101 sets a reporting interval at 419. This interval can be specified by the requesting entity or it can be fixed for a given sensor or vehicle 101. In other examples, a driver or owner may specify the polling/reporting interval for a given sensor. The vehicle 101 can also set a duration of reporting at 419, which includes, for example, reporting over X time, over N miles or until a journey ends. In many instances the requesting entity will be paying based on the total amount of data reported, and so the entity will have an incentive to specify an accurate reporting duration.

Once the reporting has been completed during the specified duration at 421, the vehicle 101 can handle payment for the request in the manner agreed upon at 411.

Figure 5:
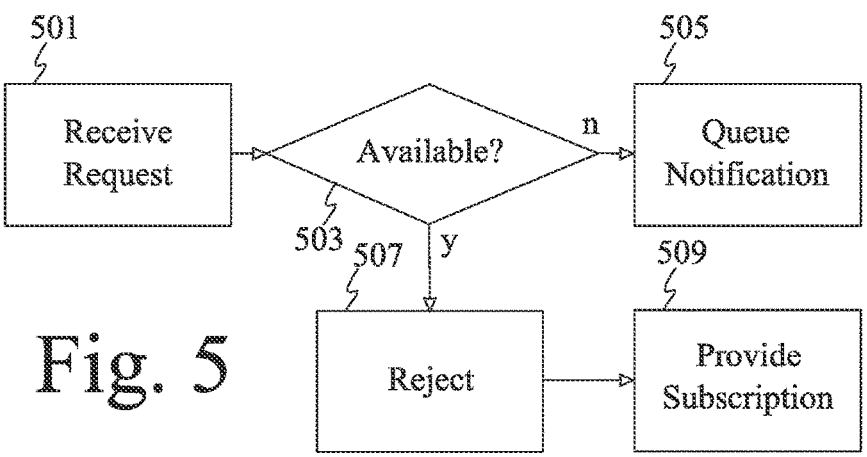
FIG. 5 shows an illustrative on-demand request handling process.

FIG. 5 shows an illustrative on-demand request handling process. This process is executable by a vehicle 101 processor 103 or a vehicle 101 processor working in conjunction with a mobile device 120 processor 121. In some instances, a vehicle driver or owner may be able to approve requests, and in other instances a passenger may have the right to approve a request. Who has the right to approve the request (and who benefits from the payment) will often be a matter that is dictated by an agreement (e.g., ridesharing company U allows riders to sell the data to defray ride cost) or dictated by what data is being sold (e.g., demographics about passenger plus the destination of the passenger could be under the control of the passenger, and brake wear data could be under the control of the driver).

The vehicle 101 receives the request at 501 and determines who is appropriate to approve the request, based on predefined parameters such as the preceding. Then, at 503, if the appropriate entity approves the request, the vehicle 101 handles the accounting at 507 for the request. So, for example, if a request for destination and passenger demographics was received, the vehicle 101 may determine that the passenger should approve the request and would send the request to the passenger mobile device 120 for approval. In this instance, the value of fulfilling the request could offset the cost of a ride or be deposited into a passenger account.

On the other hand, if a brake wear request was received, the vehicle 101 may determine that the driver is appropriate to approve the request and send the request to the HMI 111 for driver interaction and approval. In that instance, the value of fulfilling the request could go to a driver account. The vehicle 101 then sends data at 509 to the entity in accordance with an agreed upon payment at 507 when the approval is received at 503. If approval is not received at 503, the vehicle 101 can simply reject the request at 505.

Programming instructions for executing illustrative embodiments and the like may be executed by suitable processors, including, but not limited to, vehicle processors, cloud processing and/or mobile device processors, depending on the variation of the examples. Non-transitory storage media, such as, but not limited to, hard disk drives, solid state drives and other storage media used to store programming instructions, may store instructions allowing processors accessing that storage media to execute the instructions to perform the illustrative embodiments and the like.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A mobile device comprising:
   a memory storing an application using compute resources when executing; and
   a processor configured to:
   execute the application;
   determine that use of a compute resource of a vehicle is needed to preserve battery power of the mobile device while executing the application;
   communicate with the vehicle to determine whether the compute resource is available;
   responsive to determining that the compute resource is available, request use of the compute resource;
   responsive to the vehicle confirming usability of the compute resource, send data from the application to the vehicle for processing using the compute resource.

2. The mobile device of claim 1, wherein the request is originated by the mobile device processor, responsive to a broadcast by the vehicle of available resources identifying the vehicle resource as being potentially available for use.

3. A mobile device comprising:
   a memory storing an application; and
   a processor configured to
   receive a vehicle transmission identifying at least vehicle computing cycles available for use by remote applications in communication with a vehicle that transmits the transmission;
   request use of the vehicle computing cycles in conjunction with execution of the application on the mobile device, the request passively originated by the application and responsive to detecting an available connection to the vehicle, a mobile device state predefined as appropriate for using remote computing and the computing cycles being identified as available on the received whitelist;
   receive notification of a cost of using the vehicle computing cycles;
   send an agreement to pay the cost to the vehicle;
   send data and processing instructions, from the application, to the vehicle, for processing via the computing cycles pursuant to the agreement; and
   receive processed data, processed by the vehicle, at the application and integrate the processed data into the execution of the application.

4. The mobile device of claim 3, wherein the mobile device state includes a battery state below a threshold predefined as a threshold for when offboard processing should be requested.

5. The mobile device of claim 3, wherein the mobile device state includes a determination by the mobile device that accelerated processing of the data can be obtained through use of the computing cycles.

* * * * *